L. HOUSTON.

Mortising-Machines.

No. 135,337.

Patented Jan. 28, 1873.

WITNESSES. Harry Smyth
Thomas McIlvain

Levi Houston
By his attys.
Howson and Son

AM. PHOTO-LITHOGRAPHIC CO. N.Y.(OSBORNE'S PROCESS)

UNITED STATES PATENT OFFICE.

LEVI HOUSTON, OF SMITHVILLE, NEW JERSEY.

IMPROVEMENT IN MORTISING-MACHINES.

Specification forming part of Letters Patent No. 135,337, dated January 28, 1873.

*To all whom it may concern:*

Be it known that I, LEVI HOUSTON, of Smithville, Burlington county, New Jersey, have invented certain Improvements in Mortising-Machines, of which the following is a specification:

The objects of my invention are, first, to reverse, by positive mechanism, the reciprocating chisel of a mortising-machine; and, second, to set up or contract the bearing of the sliding spindle, to which the said chisel is attached, in order to counteract the evil effects resulting from wearing of the spindle and its bearing.

Figure 1:
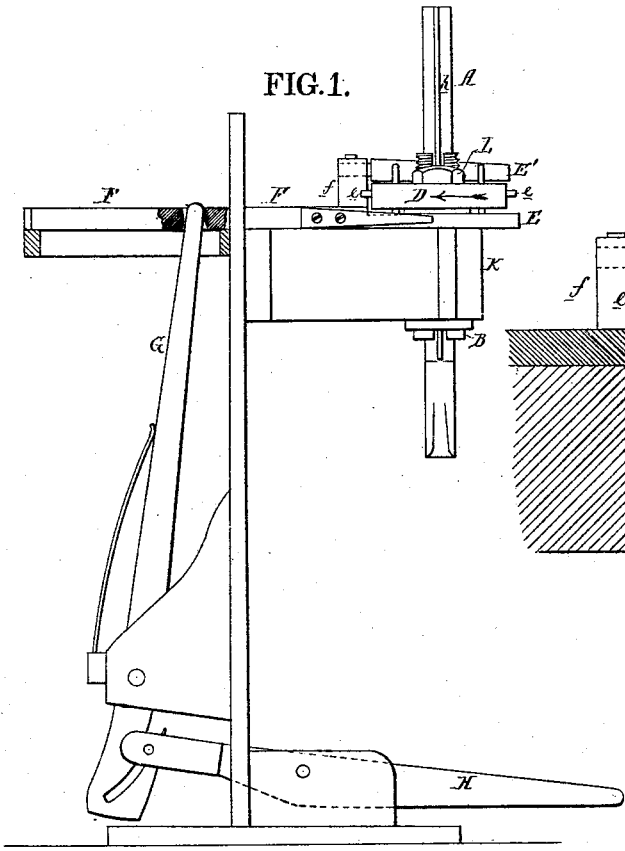
Figure 2:
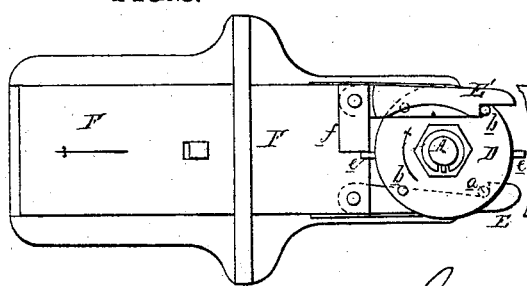

I accomplish the first of these objects in the manner illustrated in the side elevation, Figure 1, and plan view, Fig. 2, by so combining the reciprocating chisel-spindle A with a hollow spindle and disk, D, and with pawls E and E', acting on pins on the said disk, and hung to a slide, F, operated, through a lever, G, or equivalent medium, by the treadle H, which controls the vertically-adjustable work-table, that when the said treadle is released and the work-table descends the slide F, with its pawls, will be drawn back, and the disk and chisel turned a quarter way round, or thereabout; and when the table is again raised, by depressing the treadle, the slide will be moved forward, in order to turn the chisel in the same direction, to the extent of another quarter of a revolution, and to a position the reverse of that which it occupied in the first instance.

The second object of my invention is attained by causing the reciprocating chisel-spindle A to slide through a conical split bearing, B, adapted to an opening of corresponding shape in the arm K of the frame, or in the hollow spindle D' of the reversing mechanism, and capable of being tightened upon the said chisel-spindle when the parts begin to work loosely, owing to the effects of wear, by simply drawing the said bearing upward by means of a nut, L, with which it is provided at its upper threaded end. (See enlarged sections, Figs. 3 and 4.) This wedging of the split bearing into the conical opening, and the consequent tightening of the same upon the reciprocating chisel-spindle, can be continued until the said bearing has become reduced to a mere shell, when it can be readily removed and replaced by a new one.

It is not absolutely essential that the conical split bearing should be drawn upward in order to tighten it upon the spindle, as it could be reversed, and provided with a nut at its lower instead of at its upper end.

The mechanism for reversing the chisel will be fully understood from the following detailed description of its operation.

If, when the parts are in the position shown in Figs. 1 and 2, it be desired to reverse or to turn the chisel half way round, in order properly to finish a mortise which has been partially cut, the operator, by releasing the treadle, permits the table and the work resting thereon to descend by their own weight clear of the chisel. The table, in descending, also depresses the rear arm of the treadle-lever, which, through the medium of the lever G, or other connection, draws back the slide F in the direction of the arrow, Fig. 2, from the position shown in the latter figure to that represented in Fig. 5, the hooked spring-pawl E during this movement engaging with the pin $a$ on the under side of the disk D, and turning the latter and the chisel, in the direction of the arrow, to the extent of one quarter of a revolution—that is, to the position shown in Fig. 5—the other pawl E' slipping over the pin $b$ on the upper side of the disk, and assuming a position at the rear of the same. The operator now depresses the treadle in order to raise the table and work, and simultaneously with this movement the slide F is pushed forward, as indicated by the arrow, Fig. 5, and the pawl E' is forced against the pin $b$ of the disk, thus turning the latter and the chisel to the extent of another quarter of a revolution, or to a position exactly the reverse of that first described and illustrated in Fig. 1. The work is then proceeded with, and the mortise finished with the chisel in its reversed position.

It is essential, in reversing the chisel, that it should be turned exactly half way round in the two movements; but the first movement might exceed or be less than a quarter of a revolution.

By a modification of the connecting mechanism between the treadle and slide, the latter could also be caused to reverse the chisel by first moving forward and then backward, instead of the reverse, as before described.

Figure 5:
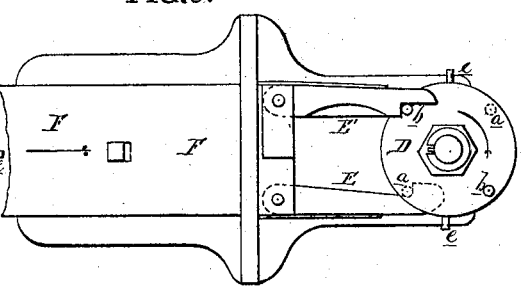

It will be observed, on reference to the plan views, Figs. 2 and 5, that the pins $a\ a$ and $b\ b$ on the lower and upper sides of the disk D are in the present instance so arranged in respect to each other, and that the extent of the movement of the pawls in respect to the said pins is such, that the movement of the disk cannot exceed or be less than a quarter of a revolution for each movement of the slide; consequently the chisel must be turned exactly half-way round or reversed for every two movements of the disk and slide caused by the raising and lowering of the treadle, as before described.

I prefer to employ spring-pawls E and E'; but the said pawls might be rigid if the extent of the movement of the slide were slightly increased.

As it is necessary that the chisel should be held perfectly firm when in operation, the disk D is provided at opposite points with stop-pins e, one of which, after the adjustment of the chisel, bears against the projection f of the slide, as shown in Fig. 2, and thus prevents the rotary movement of the disk and chisel in one direction, while all movement in the opposite direction is prevented by the pawl E, which is hooked around one of the pins a of the disk.

Figure 3:
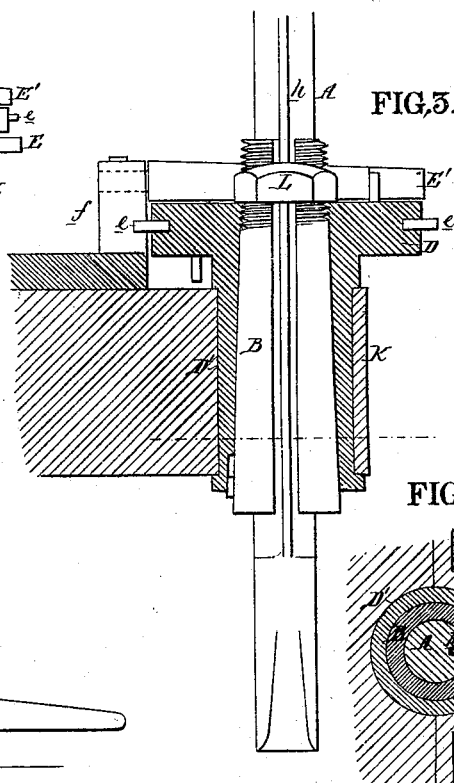
Figure 4:
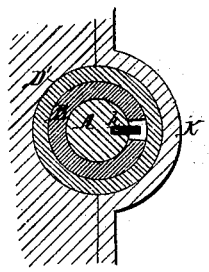

All independent rotary movement of the chisel-spindle within its bearing B is prevented by a feather, h, on the said spindle, which extends into the split portion of the said bearing, as shown in Figs. 3 and 4; and the conical bearing is itself prevented from turning independently by a projection at its lower end adapted to a recess in the frame or in the extension D' of the disk D.

The conical bearing might, without departing from my invention, be split into two or more longitudinal sections.

I claim as my invention—

1. In combination with the reciprocating chisel-spindle of a mortising-machine, a disk, D, with its pins a and b, the slide F, or its equivalent, and pawls E and E'.

2. The combination of the above with the pins e e and stop f.

3. The combination of the reversing device forming the subject-matter of the first claim with the treadle H for controlling the work-table and the intervening mechanism, whereby the table and reversing mechanism are caused to work in unison, as set forth.

4. The combination, substantially as described, with the reciprocating chisel-spindle A, of the adjustable conical split bearing B.

In testimony whereof I have signed my name to this specification in the presence of two subscribing witnesses.

LEVI HOUSTON.

Witnesses:
 WM. A. STEEL,
 HUBERT HOWSON.